(12) United States Patent
De Paoli et al.

(10) Patent No.: US 10,875,394 B2
(45) Date of Patent: Dec. 29, 2020

(54) GLAZING COMPRISING A CLIPPING PROFILED BEAD FOR A CLIP-ON COVER PIECE

(71) Applicant: SAINT-GOBAIN GLASS FRANCE, Courbevoie (FR)

(72) Inventors: Martial De Paoli, Cuts (FR); Laurent Lamoureux, Ribecourt-Dreslincourt (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/495,715

(22) PCT Filed: Mar. 29, 2018

(86) PCT No.: PCT/FR2018/050763
§ 371 (c)(1),
(2) Date: Sep. 19, 2019

(87) PCT Pub. No.: WO2018/178573
PCT Pub. Date: Oct. 4, 2018

(65) Prior Publication Data
US 2020/0094662 A1    Mar. 26, 2020

(30) Foreign Application Priority Data
Mar. 30, 2017 (FR) ..................... 17 52692

(51) Int. Cl.
*B60J 10/40*    (2016.01)
*B60J 10/32*    (2016.01)
(Continued)

(52) U.S. Cl.
CPC .............. *B60J 10/40* (2016.02); *B32B 3/06* (2013.01); *B32B 17/10036* (2013.01);
(Continued)

(58) Field of Classification Search
CPC ... E04B 2/96; E04B 2/967; B60J 10/70; B60J 1/001; B60J 10/40; B32B 3/06;
(Continued)

(56) References Cited

U.S. PATENT DOCUMENTS 8,449,016 B2 *   5/2013   Timmermann   ..........   B60J 10/70
                                                     296/146.15
8,991,893 B2 *   3/2015   Platt   ......................   B60J 10/265
                                                     296/93
(Continued)

FOREIGN PATENT DOCUMENTS

DE    36 06 566 A1    9/1987
EP    0 945 296 A1    9/1999
(Continued)

OTHER PUBLICATIONS

International Search Report as issued in International Patent Application No. PCT/FR2018/050763, dated Jun. 26, 2018.

*Primary Examiner* — Beth A Stephan
(74) *Attorney, Agent, or Firm* — Pillsbury Winthrop Shaw Pittman LLP

(57) ABSTRACT

A glazing includes a window, and along part of an edge a profiled bead including a groove for clipping a cover piece onto the profiled bead, the cover piece including, seen in cross section, a harpoon penetrating into the groove during clipping, wherein when the harpoon is situated in the groove, the cover piece further includes, farther toward the exterior than the harpoon and outside of the groove, a base situated both facing and at a distance from a part of the edge surface of the window and a part of the edge surface of the adjacent window and, farther toward the exterior than the base, a flexible exterior covering situated both facing a part of the edge surface of the window and a part of the edge
(Continued)

surface of the adjacent window, the exterior covering having a Shore A hardness between 45 and 90 inclusive.

20 Claims, 4 Drawing Sheets

(51) Int. Cl.
*B60J 10/70* (2016.01)
*B32B 3/06* (2006.01)
*B32B 17/10* (2006.01)
*B60J 1/00* (2006.01)

(52) U.S. Cl.
CPC ............... *B60J 1/001* (2013.01); *B60J 10/32* (2016.02); *B60J 10/70* (2016.02); *B32B 2315/08* (2013.01); *B32B 2605/006* (2013.01); *B32B 2605/08* (2013.01)

(58) Field of Classification Search
CPC .......... B32B 17/10036; B32B 2315/08; B32B 2605/006; B32B 2605/08
USPC ....................................................... 52/204.62
See application file for complete search history.

(56) References Cited

U.S. PATENT DOCUMENTS

| | | | |
|---|---|---|---|
| 9,259,994 B2* | 2/2016 | Erner | B60J 1/02 |
| 9,694,659 B2* | 7/2017 | Timmermann | B60J 10/30 |
| 10,239,386 B2* | 3/2019 | De Paoli | B32B 17/10036 |
| 10,625,576 B2* | 4/2020 | Kuster | B60J 1/001 |
| 2003/0126812 A1* | 7/2003 | Folsom | E06B 1/36 |
| | | | 52/204.62 |
| 2004/0221526 A1* | 11/2004 | Rinehart | B32B 17/10816 |
| | | | 52/204.62 |
| 2014/0332519 A1 | 11/2014 | Sakamoto et al. | |
| 2014/0367989 A1* | 12/2014 | Erner | B60J 1/004 |
| | | | 296/84.1 |
| 2018/0029449 A1* | 2/2018 | Dalmasso | B32B 17/10293 |
| 2018/0154752 A1* | 6/2018 | Trombetta | B60J 1/006 |

FOREIGN PATENT DOCUMENTS

| | | |
|---|---|---|
| WO | WO 01/045974 A1 | 6/2001 |
| WO | WO 01/85481 A1 | 11/2001 |
| WO | WO 2006/064153 A1 | 6/2006 |
| WO | WO 2010/006257 A2 | 1/2010 |
| WO | WO 2013/120671 A1 | 8/2013 |
| WO | WO 2013/127977 A1 | 9/2013 |
| WO | WO 2016/124868 A1 | 8/2016 |

\* cited by examiner

GLAZING COMPRISING A CLIPPING PROFILED BEAD FOR A CLIP-ON COVER PIECE

CROSS-REFERENCE TO RELATED APPLICATIONS

This application is the U.S. National Stage of PCT/FR2018/050763, filed Mar. 29, 2018, which in turn claims priority to French patent application number 1752692 filed Mar. 30, 2017. The content of these applications are incorporated herein by reference in their entireties.

The present invention concerns glazing, and in particular vehicle glazing, comprising a window, and for example glazing a laminated window comprising an exterior layer of glass, an interior layer of glass and a plastic material interlayer situated between said two layers of glass.

The glazing according to the invention includes along at least one part of at least one edge surface of the window a profiled bead including a groove for clipping a cover piece to said profiled bead, said cover piece including, seen in cross section, a harpoon penetrating into said groove during clipping.

It is known in fact for positioning and/or fixing a cover piece to a glass element to use such a profiled bead including a groove.

This profiled bead is generally fixed to the interior face of the window with the aid of an interior wing that is glued against this interior face and/or with the aid of an interlayer wing situated between the exterior layer of glass and the interior layer of glass when the window is laminated.

For good adhesion of this interior wing to the window that allows forcible clipping in the groove, this interior wing must be relatively wide (when the profiled bead is observed in cross section, as is the case in the majority of prior art documents).

Two types of situations are known in the prior art:
  when the cover piece comes to cover at least the groove by projecting over the exterior face of the window, as for example in the patent applications EP 945 296, DE 3606566; and
  when the cover piece comes to cover at least the groove without projecting above the exterior face of the window, as for example in patent application WO 2001/045974 or WO 2001/85481.

In the solution of the application WO 2001/85481 in particular, the profiled bead includes a flexible exterior covering that makes the flush join between the window to which the profiled bead is attached and a cover piece that is clipped to the profiled bead. However, it is sometimes difficult to produce this flush join with an identical esthetic appearance all along an edge surface of the glazing; it is impossible to produce this join with an identical esthetic appearance continuously along a plurality of edge surfaces of the glazing.

This join is not appropriate when two windows are adjacent.

More recently, there has been proposed in the international patent application No. WO 2016/124868 glazing including a profiled bead that allows forcible clipping, and which is therefore firmly attached to the window if it is laminated, whilst making it possible to increase the clear view through the window, thanks to an interlayer wing of the profiled bead that is situated between said interlayer face of said exterior layer of glass and said interlayer face of said interior layer of glass.

However, this solution does not make it possible to produce a flush join between the window to which the profiled bead is attached and a cover piece that is clipped to the profiled bead.

Moreover, there are known in the prior art, and in particular the international patent applications: WO 2006/064153, WO 2010/006257 and WO 2013/120671, solutions that juxtapose windows, and in particular for vehicles, where a first window and a second window juxtaposed to the first are assembled side by side thanks to an assembly system, However, it is difficult to produce a flush join with an identical esthetic appearance all along a longitudinal edge surface of two windows; it is impossible to produce this flush join with an identical esthetic appearance continuously along a plurality of edge surfaces of two windows.

An aim of the present invention is to remedy disadvantages of the prior art by proposing a grooved seal solution for clipping a cover piece edge surface to edge surface:
  between two windows,
  or even moreover between a window and a body rabbet,
  whether each window is monolithic or laminated, in order to make it possible to produce a double flush join.

This cover piece therefore produces, as seen in cross section along an edge surface of the glazing, the flush connection between one of its edge surfaces and the edge surface of a window, as well as the flush connection between another of its edge surfaces and the edge surface of the adjacent body or the edge surface of an adjacent other window, so that all these edge surface connections are flush connections.

This double flush principle participates actively in the sealing of the connections and can make it possible:
  to improve the aerodynamic coefficient by participating in the reduction of the air penetration coefficient, and/or
  to reduce the aerodynamic noise of the connections, and/or
  to reduce the penetration of dust or fluids farther toward the interior than the exterior face of the window or windows, and/or
  to compensate small clearances or small manufacturing differences from one window to the other for the same window design, and/or
  to create a discrete esthetic double connection if the exterior covering is chosen in a dark color, close to the color of the edge surfaces of the window, or to the contrary, a double connection that draws the eye if the exterior covering is chosen with a light or metallic appearance (for example a chrome-plated appearance).

The present invention therefore relates to glazing, and in particular vehicle glazing, according to claim 1. The dependent claims cover advantageous features.

This glazing comprises a window, and in particular a laminated window then comprising an exterior layer of glass, an interior layer of glass and a plastic material interlayer situated between said two layers of glass, said window, whether laminated or not, having an exterior face, an edge surface and an interior face, said glazing farther including an adjacent window, in particular an adjacent laminated window comprising an exterior layer of glass as well as an interior layer of glass and a plastic material interlayer situated between said two layers of glass, said adjacent window having an exterior face, an edge surface and an interior face.

This glazing is remarkable in that said window includes along at least one part of at least one longitudinal edge surface a profiled bead including a groove for clipping a cover piece to said profiled bead, said cover piece including, seen in cross section, a harpoon penetrating into said groove during clipping.

Accordingly, when said harpoon is situated in said groove, said cover piece farther includes:

- on the one hand, farther toward the exterior than said harpoon and outside of said groove: a base, this base being situated facing both at least one part of said edge surface of said window that carries the profiled bead and at least one part of said edge surface of said adjacent window; this base is situated facing only a part of said edge surface of the window that carries the profiled bead in the direction of the thickness of this window (that is to say the height of said edge surface) and is situated facing a part or the totality of said edge surface of the window that carries the profiled bead in the direction of the length of said edge surface; and
- on the other hand, farther toward the exterior than said base: a flexible exterior covering; this exterior covering being situated facing both at least one part of said edge surface of said window that carries the profiled bead and at least one part of said edge surface of said adjacent window and having a Shore A hardness between 45 and 90 inclusive, or even between 55 and 85 inclusive; this exterior covering is situated facing only a part of said edge surface of the window that carries the profiled bead in the direction of the thickness of that window (that is to say the height of said edge surface) because the base that is situated underneath, toward the interior, also faces this edge surface; it is situated facing a part or the totality of said edge surface of the window that carries the profiled bead in the direction of the length of said edge surface.

Said harpoon, said base and said exterior covering are parts of said cover piece and each forms an integral part of this cover piece; it is not possible to separate an element of this assembly without damaging the integrity of the cover piece.

As the material of the exterior covering is preferably different from that of the harpoon, the cover piece can then be manufactured by co-extrusion of a plurality of materials. The fact that the cover piece is constituted of a plurality of materials then complicates its manufacture but the advantages procured by the flexibility of the exterior covering are considerable.

This exterior covering is preferably in contact with the edge surface of the window that carries the profiled bead in order for this contact to participate in reducing the penetration of dust or fluid farther toward the interior and confers an esthetic appearance of continuity.

Surprisingly, it has thus been discovered that it was possible to produce a cover piece with a harpoon and a flexible exterior covering to produce a flush double connection between a first window and an adjacent second window, or even moreover between said window that carries the profiled bead and an adjacent body rabbet. This material of the exterior covering is flexible and this flexibility is expressed here by a relatively low Shore A hardness.

It is therefore possible for said profiled bead to extend along at least two edges (for example a transverse edge surface and a longitudinal edge, or even two longitudinal edges) of said window, in order additionally to make it possible to produce a flush double connection between said window that carries the profiled bead and one, or even two, body rabbet(s) adjacent that window.

This flexible exterior covering solution is simpler to manufacture than the prior art solutions whereby it is the profiled bead itself that includes a flexible interior covering for the junction between a cover piece and the window that carries the profiled bead.

It moreover makes it possible to produce a cover piece with an exterior covering that extends in one piece along a plurality of edges of a window that carries the profiled bead, or even along the totality of the periphery of a window, whether the window including the profiled bead is, in the vehicle:

- partially surrounded by a body rabbet with an adjacent other window along at least one part (or the totality) of one of its edges,
- or even moreover surrounded by a body rabbet along other edges.

As the harpoon is the part of the cover piece that penetrates into the groove of the profiled bead to effect the clipping, the harpoon is not in contact with the edge surface of the window that carries the profiled bead.

The harpoon may be present all along said cover piece or may be provided at a plurality of locations along said cover piece.

At least said harpoon, or even said harpoon and said base, preferably has (or preferably both have) a hardness greater than that of the exterior covering; this was already necessary in the prior art and is still necessary because it is directly linked to the function of the harpoon: to be correctly retained by the groove, the harpoon must be sufficiently hard.

It is possible for the base and the exterior covering to be combined and constituted of the same material; however, the exterior covering is necessarily of a different and more flexible material than the harpoon, with a hardness that is not on the same scale (Shore A for the exterior covering and Shore D for the harpoon).

When the base and the exterior covering are constituted of different materials, the base is situated at a distance from at least one part of said edge surface of the window that carries the profiled bead, that is to say is not in contact with this edge surface; when the base and the exterior covering are constituted of the same material, the base may be in contact with the edge surface of the window that carries the profiled bead.

Said profiled bead preferably has a Shore D harness between 1 and 100 inclusive, or even between 5 and 95 inclusive.

Said harpoon preferably has a Shore D hardness between 1 and 100 inclusive, or even between 5 and 95 inclusive.

Said base preferably has a Shore D hardness between 1 and 100 inclusive, or even between 5 and 95 inclusive.

Said groove of the profiled bead is preferably open toward the exterior and said base as well as said exterior covering are intended to be positioned farther toward the exterior than said groove of the profiled bead.

Said glazing that includes the profiled bead is fixed glazing intended to be stuck into a window opening to close that window opening.

Said exterior covering preferably has an exterior face that is situated in continuity with said exterior face of said window.

It is the exterior covering that both confers the esthetic appearance, seen from the exterior, of the cover piece through preferably being continuous with the surface of the window and produces some degree of sealing to prevent water or dust from penetrating between the window and the cover piece through preferably being in contact with the edge surface of the window that carries the profiled bead;

this seal is not absolute because it is the bead of glue that produces the highest level of seal between the exterior and the interior.

Said base preferably has a width between 2.0 and 20.0 mm inclusive, or even between 3.0 and 15.0 mm inclusive, or even between 4.0 and 10.0 mm inclusive, in order to be sufficiently strong whilst being relatively compact.

Said exterior covering preferably has a width between 1.05 and 1.5 times inclusive the width of said base in order for said base not to be in contact with the edge surface of said window and thus to ensure that it is indeed said exterior covering that is in contact with the edge surface of the window.

Alternatively, the glazing according to the invention includes, in addition to the first window, an adjacent second window, in particular an adjacent laminated window then comprising an exterior layer of glass as well as an interior layer of glass and a plastic material interlayer situated between said two layers of glass, said adjacent window having an exterior face, an edge surface and an interior face, said base of said cover piece being situated facing at least one part of said edge surface of the adjacent window and said exterior covering being situated facing at least one part of said edge surface of the adjacent window. Accordingly:
  on the one hand, the base of the cover piece is situated facing only a part of said edge surface of the adjacent window in the direction of the thickness of that adjacent window (that is to say the height of its edge surface) and is situated facing a part or the totality of said edge surface of the adjacent window in the direction of the length of that edge surface; and
  on the other hand, the exterior covering is situated facing only a part of said edge surface of the adjacent window in the direction of the thickness of that adjacent window (that is to say the height of that edge surface) because the base that is situated underneath, toward the interior, also faces this adjacent edge surface; it is situated facing a part or the totality of said edge surface of the adjacent window in the direction of the length of that edge surface.

When the base and the exterior covering are constituted of different materials, the base is situated at a distance from at least one part of said edge surface of the adjacent window, that is to say not in contact with that edge surface; when the base and the exterior covering are constituted of the same material, the base may be in contact with the edge surface of the adjacent window.

In this variant, said exterior face of said adjacent window is preferably situated in continuity with said exterior face of said window.

In this variant, the edge surface of said adjacent window is moreover preferably bare, with no plastic material bead, and moreover the exterior face of said adjacent window is preferably also bare, with no plastic material bead in contact with the exterior face of said adjacent window.

In this variant, said profiled bead is moreover preferably separated without contact from the edge surface of said adjacent window.

Whichever the variant, said profiled bead is preferably situated along a front edge and/or along a rear edge of said window positioned flat.

When the glazing is roof glazing, said profiled bead is preferably situated along only a front edge; this is the most important edge for control of aerodynamics and noise.

In a very particular variant of the invention said profiled bead is peripheral, situated all along a perimeter of said window.

For its effective and compact fixing to a laminated window, it is preferable if said profiled bead includes, seen in cross section, an interlayer wing and the window is laminated, said interlayer wing being situated between an interlayer face of said exterior layer of glass and an interlayer face of said interior layer of glass.

It must be understood that the expression "an interlayer wing situated between an interlayer face of said exterior layer of glass and an interlayer face of said interior layer of glass" means that the interlayer wing extends in the direction of its transverse width between an interlayer face of said exterior layer of glass that is the face of the exterior layer of glass situated toward the interlayer and an interlayer face of said interior layer of glass that is the face of the interior layer of glass situated toward the interlayer.

Said interlayer wing is in direct or indirect contact (and in the latter case via an adhesive material) with said interlayer face of said exterior layer of glass and is in direct or indirect contact (and in the latter case via an adhesive material) with said interlayer face of said interior layer of glass.

Said interlayer wing then preferably has a thickness:
  equal to the thickness between said exterior layer of glass and said interior layer of glass and in particular equal to the thickness of said plastic material interlayer and in particular equal to 0.76 mm, or
  less than the thickness between said exterior layer of glass and said interior layer of glass.

Said interlayer wing is preferably retained mechanically between the interlayer face of the exterior layer of glass and the interlayer face of the interior layer of glass, for example by being compressed between these two faces, and/or chemically retained, for example by being stuck to these two faces. Although this is not shown, it is moreover possible for the interlayer wing to be embedded (mechanically and chemically retained) in the plastic material interlayer, with the material of this plastic material interlayer on the one hand between the interlayer wing and the interlayer face of the exterior layer of glass and/or on the other hand between the interlayer wing and the interlayer face of the interior layer of glass.

In a variant independent of the others that can be combined with the others, seen in cross section, said exterior face of said window is free facing said groove and said interior face of said window is free facing said groove.

Accordingly, when the window is a laminated window, seen in cross section, said exterior face of said exterior layer of glass is free facing said groove and said interior face of said interior layer of glass is free facing said groove.

Said groove is preferably situated facing the edge surface of said window that carries the profiled bead and does not extend over said exterior face of that window.

Said groove of the profiled bead is preferably situated facing a part of said edge surface of the window that carries the profiled bead in order for the clipping system to be compact; this groove is situated facing only part of said edge surface of the window in the direction of the thickness of that window (that is to say the height of said edge surface) and is situated facing a part or the totality of said edge surface of the window in the direction of the length of said edge surface.

When the window that carries the profiled bead is a laminated window, said groove is preferably situated facing the edge surface of said interior layer of glass, or even moreover facing the edge surface of the plastic material interlayer, but is not situated facing the edge surface of said exterior layer of glass. This is a particularly compact solution.

When the adjacent window is a laminated window, said groove is preferably situated facing the edge surface of said interior layer of glass of the adjacent window, or even facing the edge surface of the plastic material interlayer of the adjacent window, but is not situated facing the edge surface of said exterior layer of glass of the adjacent window. This is a particularly compact solution.

For effectively fixing it to the window that carries it, said profiled bead may include, seen in cross section, an interior wing situated below said interior face of that window.

To improve farther the seal against water and dust and to reduce the propagation of exterior aerodynamic noise, said base may include, seen in cross section, at least one, and preferably two, interior lip(s) respectively oriented toward a centrifugal throat of said groove and/or toward a centripetal throat of said groove, said or each interior lip preferably being made of a material different from that of said base and more preferably being made of a material identical to that of said exterior covering.

To improve the seal against water and dust and to reduce the propagation of exterior aerodynamic noise, said exterior covering may be in contact with at least a part of said edge surface of the window, or even moreover in contact with at least one part of said edge surface of the adjacent window; this contact or these contacts is or are preferably without adhesion.

This contact is against only a part of said edge surface of the window (or even of the adjacent window) in the direction of the thickness of that window (or even of the adjacent window) because the base that is situated underneath, toward the interior, is also facing the edge surface of this window (or even of the adjacent window); this contact is against a part or the totality of said edge surface of the window (or even of the adjacent window) in the direction of the length of that edge surface.

However, instead of this contact or these contacts, said base may include, seen in cross section, at least one, and preferably two, exterior lip(s) respectively oriented toward said edge surface of the window (2) with contact and/or toward said edge surface of said adjacent window with contact.

This contact is also against only a part of said edge surface of the window that carries the profiled bead (or even moreover of the adjacent window) in the direction of the thickness of that window (or even of the adjacent window) because the base that is situated underneath, toward the interior, also faces the edge surface of that window (or even of the adjacent window); this contact is against a part or the totality of said edge surface of the window (or even of the adjacent window) in the direction of the length of that edge surface.

When a profiled bead includes, as seen in cross section, an interlayer wing the window to which it is fixed is then necessarily laminated; when a profiled bead includes, seen in cross section, an interior wing the window to which it is fixed is then not necessarily laminated; it may be monolithic or laminated.

In a variant independent of the others that may be combined with the others, said groove includes, seen in cross section, two longitudinal bosses situated facing one another and respectively below a centrifugal throat of said groove and a centripetal throat of said groove.

To improve the reliability of the positioning of the cover piece relative to the profiled bead and therefore relative to the window that carries that profiled bead said harpoon preferably includes, seen in cross section, a flat interior end that comes to be lodged between said longitudinal bosses of said groove.

Said base is preferably at a distance above said groove, that is to say that said base is not in contact with said groove. There is therefore no risk of the base unfavorably influencing the clipping of the harpoon in this groove and this clipping is more reliable over time.

In a variant independent of the others than that can be combined with the others, said cover piece includes, seen in cross section, a plane of symmetry in order for the cover piece not to have a right way round to be fitted and therefore to prevent fitting errors.

Said groove preferably also includes a plane of symmetry that coincides with that of said cover piece in order to facilitate fitting.

However, it is possible for said cover piece to have, seen in cross section, an asymmetrical shape, with an exterior covering that extends laterally farther toward a rabbet or an adjacent window than toward said window that carries the profiled bead, taking the harpoon as a reference.

The present invention advantageously makes it possible to propose glazing with a clipping profiled bead that is reliable, compact and simple to use.

It is therefore possible to produce glazing including two windows, one that carries a profiled bead with a groove and an adjacent other one that does not carry a profiled bead with a groove, with the result that the exterior face of the two windows are continuous with one another, this continuity being produced by the exterior covering between the edge surfaces of the windows.

In this case, the two contiguous windows are not fixed (in the sense of directly attached or stuck) to one another: each is fixed (stuck) to a single element (that is to say to the same element) of the window opening that they together close, that is to say to a body element (such as for example a rabbet) in the case of application of the glazing as vehicle glazing.

In the present document, when ranges of values are indicated, the limits are included in the ranges.

Ways of executing the assembly of a cover piece to a window using a profiled bead are described hereinafter by way of nonlimiting example with reference to the appended figures.

In each figure, in order to facilitate reading them, the proportions between the various elements are respected and elements in the background are generally not represented. The same references designate the same elements from one figure to another.

Figure 1:
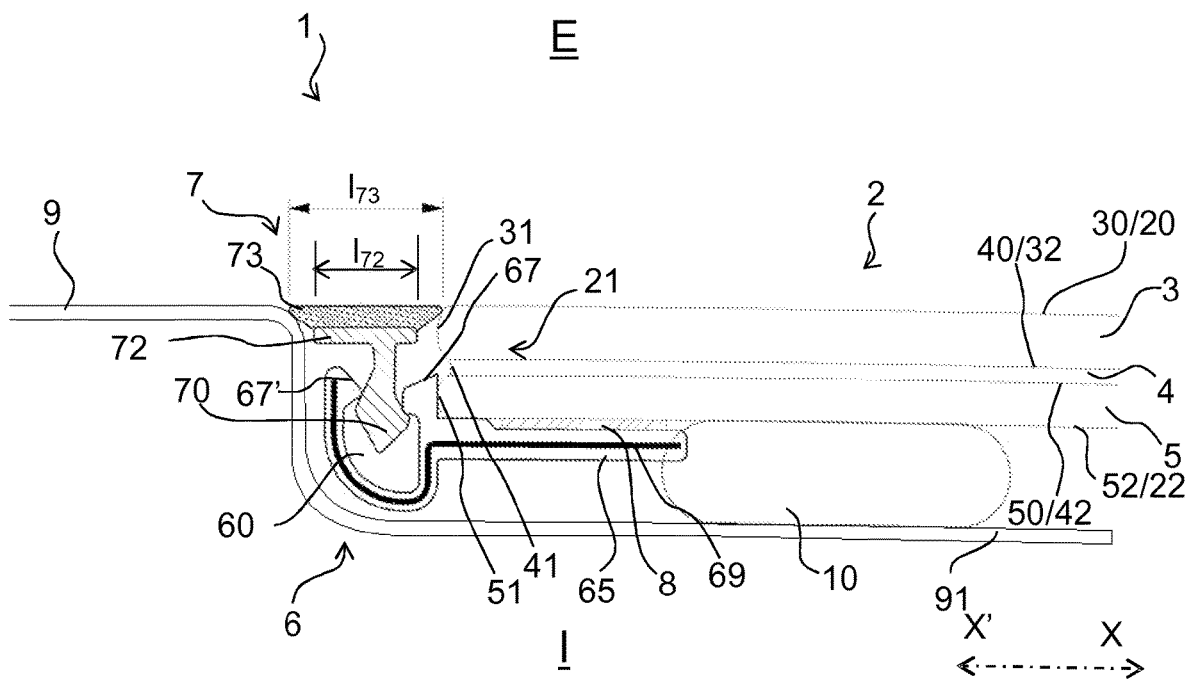
FIG. 1 is a sectional view of a first embodiment of the assembly in the vicinity of a body rabbet of a cover piece on a profiled bead with a lateral groove and interior wing.

The present invention relates to glazing 1, as can be seen in part in FIGS. 1 to 7, comprising at least one monolithic or laminated window 2.

The present invention is described by way of example in the context of an application as vehicle glazing, that glazing producing a separation between an exterior space E that is outside the vehicle and an interior space I that is inside the vehicle. The "exterior" and "interior" concepts are therefore considered with respect to this exterior space E and this interior space I, respectively.

The window 2 therefore has an exterior face 20 oriented toward the exterior space E, an interior face 22 oriented toward the interior space I and a peripheral edge surface 21 situated between these two faces.

The present invention is described in particular in application to fixed vehicle roof glazing and the figures are therefore views in vertical section of the window 1 installed in and stuck into a body window opening.

Figure 2:
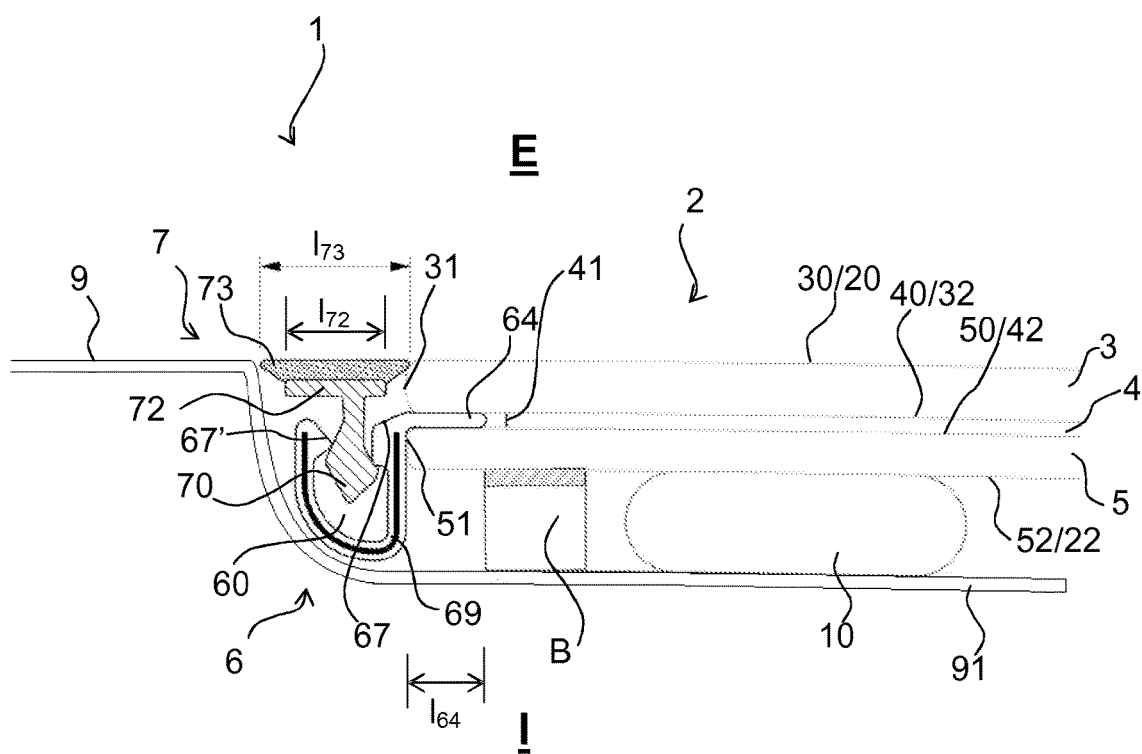
FIG. 2 is a sectional view of a variant of the FIG. 1 embodiment in which the profiled bead has an interlayer wing.

For the variants from FIGS. 1 and 2, this is an application to vehicle roof glazing including only one window.

For the variants from FIGS. 3 to 7, this is an application to vehicle roof glazing including two windows side by side or to be more precise one in front of the other in the direction of forward movement of the vehicle.

Figure 3:
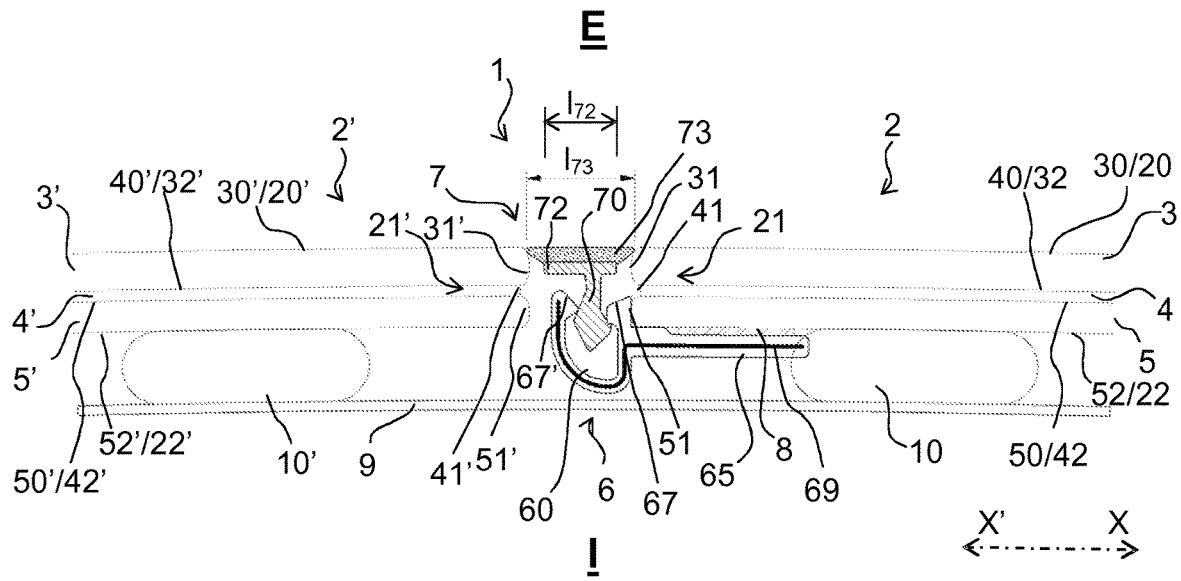
FIG. 3 is a sectional view of a second embodiment of the assembly between two windows of a cover piece on a profiled bead with a lateral groove and interior wing.

In the context of the present document, the "centripetal" concept and the "centrifugal" concept are to be considered relative to the central longitudinal axis of forward movement of the vehicle equipped with the glazing according to the invention as roof glazing, that is to say the axis generally termed the axis X-X' of the vehicle, as can be seen in FIGS. 1 and 3 only, although the orientation is the same in the other figures; the centripetal direction is the direction X on this axis whilst the centrifugal direction is the opposite direction X'.

The glazing 1 is intended to close a window opening that here is formed in a body of the vehicle; an edge surface of this window opening—in this instance a front transverse edge surface for FIGS. 1 and 2 and a central transverse edge surface for FIGS. 3 to 7, is illustrated by a rabbet 9.

The window 2 of the glazing 1 may be a monolithic window constituted of a single layer of glass.

The window 2 of the glazing 1 is preferably a laminated window that includes, from the exterior toward the interior, at least: an exterior layer of glass 3, a plastic material interlayer 4 and an interior layer of glass 5; however, it is possible for at least one other layer to be interleaved between the exterior layer of glass 3 and the plastic material interlayer 4 or between the plastic material interlayer 4 and the interior layer of glass 5.

In the figures, each layer of glass is shown with a rounded edge surface; however, these edge surfaces may be straight, with right-angle intersections between the edge surfaces and the faces.

The exterior layer of glass 3 has an exterior face 30 oriented toward the exterior E and therefore corresponding to the exterior face 20 of the window 2, an interlayer face 32 oriented toward the plastic material interlayer 4, and an edge surface 31 situated between these two faces.

The interior layer of glass 5 has an interlayer face 50 oriented toward the plastic material interlayer 4, an interior face 52 oriented toward the interior I and therefore corresponding to the interior face 22 of the window 2, and an edge surface 51 situated between these two faces.

The plastic material interlayer 4 has an exterior interlayer face 40 oriented toward the interlayer face 32 and here in contact with that interlayer face 32, an interior interlayer face 42 oriented toward the interlayer face 50 and here in contact with that interlayer face 50, and an edge surface 41 situated between these two interlayer faces 40, 42.

The window 2 therefore has an exterior face formed by the exterior face 30 of the exterior layer of glass 3, an interior face formed by the interior face 52 of the interior layer of glass 5 and an edge surface situated between these two faces, corresponding to the edge surface 31 of the exterior layer of glass 3 and to the edge surface of the interior layer of glass 5, these two edge surfaces (on the one hand 31, 51 and on the other hand 31', 51') being here continuous with one another whilst being separated by a gap corresponding to the thickness of the plastic material layer 4.

The glazing 1 is intended to be glued onto the rabbet 9 with the aid of a bead of glue 10 shown diagrammatically that is situated between the interior face 52 of the interior layer of glass and an adjacent part of the rabbet 9.

The glazing 1 includes in addition to the window 2 along at least one portion of at least one edge surface of the window 2 a profiled bead 6 including a groove 60 for clipping a cover piece 7 onto said profiled bead 6, said cover piece 7 including, seen in cross section, a harpoon 70 penetrating into said groove 60 during clipping.

The groove 60 has a mouth and a bottom: during clipping of the cover piece 7, the harpoon 70 penetrates into the groove 60 through the mouth and in the direction of the bottom; in the clipped position, the harpoon 70 generally does not touch the bottom of the groove.

The mouth of the groove, through which the harpoon 70 is introduced, is produced by two throats: a centripetal throat 67 situated in line with the harpoon 70 in the figures and a centrifugal throat 67' situated to the left of the harpoon 70 in the figures. The object of these two throats is to guide the harpoon 70 accurately toward the bottom of the groove 60 during the clipping of the harpoon 70.

The cover piece 7 is intended to be positioned farther toward the outside than the profiled bead 6 and to be more precise farther to the outside than the groove 60.

Figure 4:
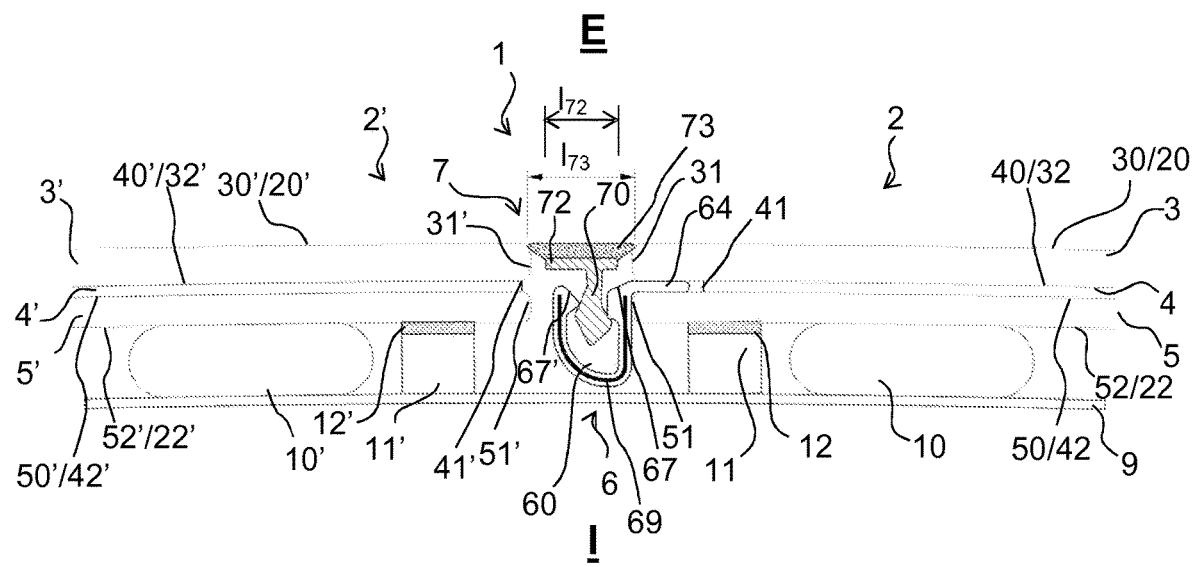
FIG. 4 is a sectional view of a variant of the embodiment from FIG. 3 in which the profiled bead includes an interlayer wing.
Figure 5:
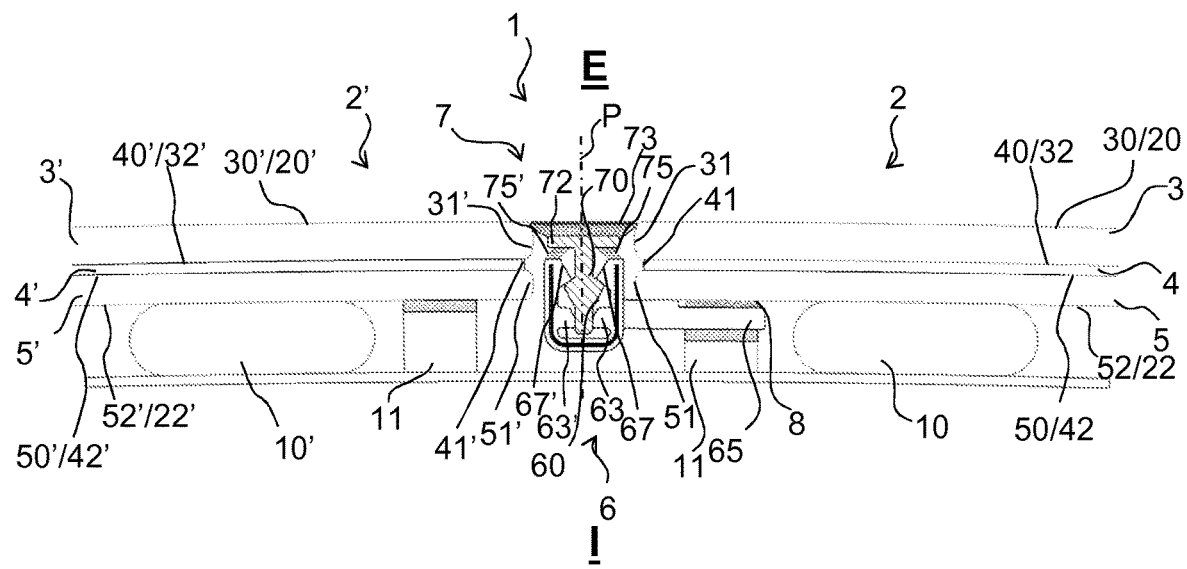
FIG. 5 is a sectional view of a variant of the FIG. 3 embodiment in which the profiled bead includes a slot forming a lateral groove and an interior wing and in which the cover piece includes interior lips.

For its attachment to the window 2, the profiled bead 6 includes, seen in cross section:
- an interior wing 65 situated below an edge of the interior face 22 of the window 2, and here to be more precise below an edge of the interior face 52 of the interior layer of glass 5, as can be seen in FIGS. 1, 3 and 5, and/or
- when the window 2 is a laminated window, an interlayer wing 64 situated between the interlayer face 32 of the exterior layer of glass 3 and the interlayer face 50 of said interior layer of glass 5, as can be seen in FIGS. 2 and 4.

These two attachment methods are described hereinafter.

Profiled Bead with Interior Wing

The profiled bead 6 includes, seen in cross section, an interior wing 65 situated below (directly below, or indirectly below with interposition/insertion of a layer of glue or an adhesive tape) the interior face 22 of the window 2; the interior wing 65 is therefore farther toward the interior than the interior face 22.

An adhesive strip 8 formed by a layer of glue or a double-sided adhesive tape is situated between a centripetal part of the interior wing 65 and the interior face 22.

This adhesive strip enables this interior wing 65 to be fixed to the underlying interior face 22.

Profiled Bead with Interlayer Wing

The interlayer wing 64 is preferably in contact with a part of the interlayer face 32 of said exterior layer of glass 3 and on the other hand with the interlayer face 50 of the interior layer of glass 5 and extends between these two faces.

Along the edge of the window including the profiled bead 6 with an interlayer wing the edge surface 41 of the plastic material interlayer 4 is therefore centripetally set back relative to the respective edge surfaces 31, 51 of the exterior sheet of glass and of the interior sheet of glass to allow the presence of the interlayer wing.

In FIGS. 2 and 4, the interlayer wing 64 is a single wing, produced in the same material as and in one piece with the groove 60, with no reinforcement.

As can be seen in FIGS. 2 and 4, the totality of an exterior face of the interlayer wing 64 is in contact with the interlayer face 32 of said exterior sheet of glass 3 and the totality of an interior face of the interlayer wing is in contact with the interlayer face 50 of the interior layer of glass 5.

The interlayer wing 64 therefore occupies the gap situated starting vertically below the edge surface 31 of the exterior layer of glass and above the edge surface 52 of the interior layer of glass and in the direction of the plastic material interlayer 4; the interlayer wing therefore has a thickness identical to the thickness of the plastic material interlayer 4 (in this instance here a thickness of 0.76 mm). However, it does not come into contact with the plastic material interlayer 4 in order not to interfere with the cohesion produced by this plastic material interlayer 4 with the two layers of glass, that is to say in order not to interfere with the lamination.

The interlayer wing 64 has a width $l_{64}$, shown in FIG. 2, between 2.0 and 6.0 mm inclusive, or even between 3.0 and 5.0 mm inclusive. This width is sufficient to enable good retention of the interlayer wing between the exterior layer of glass and the interior layer of glass without risk of interfering with the cohesion of the plastic material interlayer 4 with the two layers of glass.

In FIGS. 2 and 4, the interlayer wing 64 does not come into contact with the plastic material interlayer 4. It is retained between the interlayer face 32 and the interlayer face 50 by being compressed (mechanically retained) between these two faces, as shown here; it could be stuck (chemically retained) to these two faces. Although this is not shown, it is moreover possible for the interlayer wing 64 to be embedded in the plastic material interlayer 4, with the material of this plastic material interlayer 4 on the one hand between the interlayer wing 64 and the interlayer face 32 and/or on the other hand between the interlayer wing 64 and the interlayer face 50.

It is possible to produce an interlayer wing with a thickness less than the thickness between the exterior layer of glass and said interior layer of glass of the window.

The window 2 rests on the rabbet 9 thanks to an abutment 11 (or a plurality of abutments distributed along the edge) disposed between the interior face 22 and the face of the rabbet oriented toward the outside. This abutment or these abutments can make it possible to prevent contact between the interior face 22 and the rabbet in order to make it possible to protect the window 2 and for example to have a flexible exterior face 12; it or they may also make it possible to control the thickness of the bead of glue 10.

When the profiled bead includes both an interlayer wing and an interior wing, so as to be able to hold the interior wing 65 away from the interior face 52 during the introduction of the interlayer wing 64 into the gap between the two layers of glass, the interior wing 65 includes a flexible polymer material hinge portion (not shown).

This hinge portion enables the interior wing 65 to be raised to position the adhesive strip 8 (in the case of a layer of glue) or to activate the adhesive strip 8 (in the case of a double-sided adhesive tape with a temporary protection film that can be peeled off) and make it possible to fix the interior wing 65 to the underlying interior face 52.

In the figures the groove 60 is a lateral groove: the groove 60 of the profiled bead extends along a part of the edge surface of the window 2, on the side of the edge surface of the window 2, and the mouth of the groove is oriented toward the outside.

The groove 60 is a lateral groove because it does not extend past an imaginary plane continuous with the exterior face 20 of the window 2.

The exterior face 20 of the window 2 is therefore free relative to the profiled bead: the profiled bead does not include an exterior wing.

In the variants shown in FIGS. 1 to 7 the groove 60 is situated below the edge surface 31 of said exterior layer of glass 3 from the point of view of the interior/exterior orientation and facing the edge surface 51 of said interior layer of glass 5.

In the variants shown in FIGS. 1 to 7, the groove 60 is situated against the edge surface 51 of said interior layer of glass 5.

The two throats are situated farther toward the interior than the exterior face 30 of the exterior layer of glass 3; they are situated below this exterior face 30 where the extension of that face beyond the edge surface 31 is concerned; accordingly, space is available above the groove for the base 72 and the exterior covering 73 of the cover piece.

The bottom of the groove 60 is situated farther toward the interior than the interior face 52 of the interior layer of glass 5; this does not impede the positioning of the glazing in the window opening of the body because there is room between the interior face 52 and the rabbet 9 because of the presence of the bead of glue 10.

Each of the two throats at the mouth of the groove is in the shape of a hammer with the heads situated facing one another from the point of view of the interior/exterior orientation.

As can be seen in FIGS. 1 to 7, in order to enable uniform distribution of stresses, the bottom of the groove 60 forms a symmetrical U; the groove therefore has a plane of symmetry P.

Whatever the embodiment, the constituent material of the groove 60 may be reinforcible by the internal presence of an insert 69, such as a metal insert for example, which makes it possible to increase the stiffness of the groove. This insert may for example be an aluminum profiled element 0.4 mm thick.

This insert may lie inside a wing, that is to say inside the interlayer wing 64 or inside the interior wing 65, as can be seen in FIGS. 1 and 3.

In the figures, the groove 60 has a height of approximately 7.8 mm and a width of approximately 5.5 mm; the interlayer wing 64 has a width $l_{64}$ of approximately 3.0 mm, the interior wing 65 has a width of approximately 12.0 mm and the adhesive strip 8 has a width of approximately 6 mm.

The cover piece 7 is intended to cover the groove 60 when the glazing 1 is seen from the exterior E and to cover only this groove 60. Here, in the context of the application to an edge of vehicle roof glazing, this is a piece intended to limit the penetration of water, and in the context of an application to the trim on the side of the glazing provided therewith. This may be a trim.

The cover piece 7 includes, in addition to the harpoon 70:
on the one hand, farther toward the exterior than the harpoon 70, a base 72, and
on the other hand, farther toward the exterior than the base 72, an exterior covering 73.

The base 72 is situated facing and at a distance from at least one part of the edge surface 21 of the window 2, that is to say the base 72 is not in contact with the edge surface 21 of the window 2 to which the profiled bead 6 is fixed.

The base 72 extends above the groove 60, that is to say farther toward the exterior than the groove 60; it covers the groove 60 in the sense that it has a width 172 that is greater than the mouth of the groove through which the harpoon passes during clipping and that width is substantially the overall width of the groove.

The base 72 has a width 172 between 2.0 and 20.0 mm inclusive, or even between 32.0 and 15.0 mm inclusive, or even between 4.0 and 10.0 mm inclusive and here of precisely 5.5 mm, that is to say equal to the width of the groove 60.

When the harpoon is clipped into the groove, the base is not situated exactly above the groove 60, but is slightly offset in the centrifugal direction by approximately +1.0 mm.

The base 72 is preferably in one piece with the harpoon 70; it is for this reason that they are shown with the same cross-hatching in the figures. They are preferably made from a relatively rigid material, such as for example a thermoplastic polymer of the polypropylene type.

As can be seen in the figures, the base 72 is preferably at a distance from the groove 60, that is to say is not in contact with this groove. The base 72 is above the centripetal throat 67 and the centrifugal throat 67', at a distance of the order of 0.3 to 2.0 mm from these two throats, for example 0.5 mm; accordingly, even if the base is deformed in use, for example when the vehicle is moving, it cannot cause the harpoon to escape from the groove.

The exterior covering 73 is flexible. It is situated facing and in contact with at least one part of the edge surface 21 of the window 2 to which the profiled bead 6 is fixed.

It has a Shore A hardness between 45 and 95 inclusive, or even between 55 and 85 inclusive; it is this low hardness that confers on it its flexibility. It may for example be made from a thermoplastic elastomer (TPE) of the polyurethane-based TPE-U type or of the styrene-based TPE-S type.

The contact of the exterior covering 73 with the edge surface 21 is merely contact, without adhesion, in order to enable the cover piece to be unclipped if necessary.

As can be seen in the figures, the exterior face 20 of the window 2 is free relative to the cover piece 7; the exterior covering 73 has an exterior face that is situated in continuity with the exterior face 20 of said window 2. The cover piece 7 is therefore flush with the continuity of the exterior face 20 of the window 2; it is "flush". The cover piece 7 does not extend farther toward the exterior than the exterior face 20 of the window 2.

The base 72 therefore provides a rigid support for the exterior covering 73. The exterior covering 73 covers completely the side of the base 72 that faces toward the outside and extends beyond, both in the centrifugal direction and in the centripetal direction.

Figure 7:
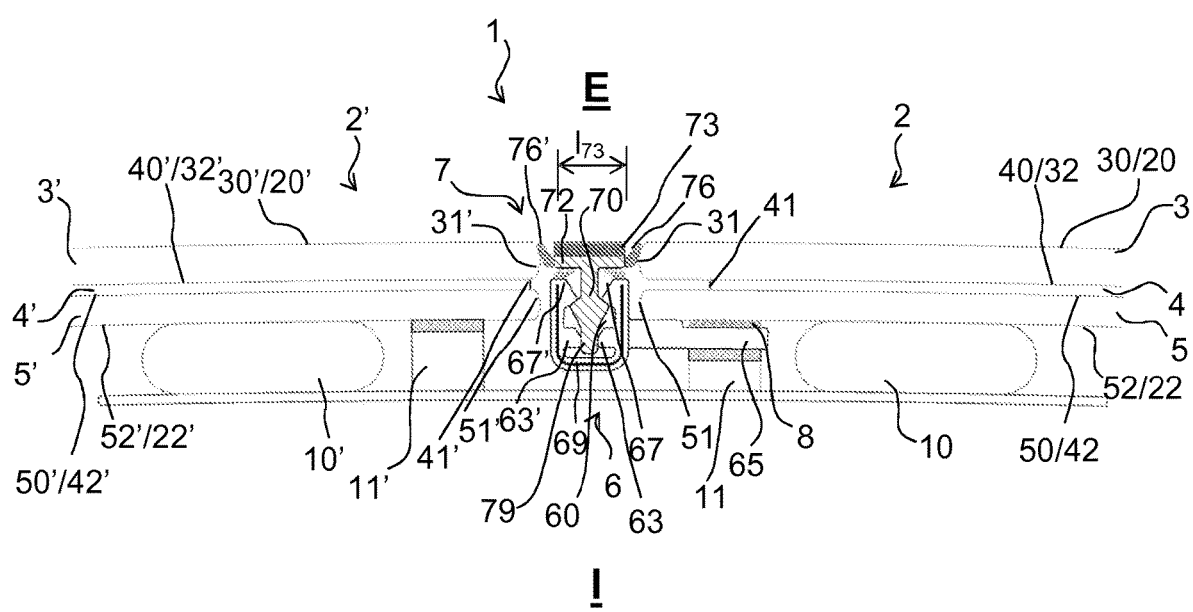
FIG. 7 is a sectional view of a variant of the embodiment from FIG. 5 in which the cover piece includes interior lips and exterior lips.

The exterior covering 73 therefore has a width $l_{73}$ at least equal to or even greater than the width $l_{72}$ of the base 72:

in FIGS. 1 to 6 the exterior covering 73 has a width $l_{73}$ between 1.05 and 1.55 times inclusive the width $l_{72}$ of the base 72, and to be more precise here 1.45 times, that is to say 8.0 mm;

whilst in FIG. 7 the exterior covering 73 has a width 173 equal to the width $l_{72}$ of the base 72.

As indicated above, the cover piece 7 may be used when a single window 2 is fixed to a body rabbet 9, as shown in FIGS. 1 and 2, or when a window 2 and an adjacent window 2' are fixed side by side to the same body rabbet 9, as shown in FIGS. 3 to 7.

In this second mode of use, that of FIGS. 3 to 7, the glazing 1 therefore includes, in addition to the window 2, an adjacent window 2' that is described here in the same manner as the window 2, using the same reference numbers to designate the same elements, but adding a "'".

It is to be noted that the profiled bead 6 is fixed only to the window 2; it is not fixed to the adjacent window 2'.

This adjacent window 2' may be a monolithic adjacent window but is preferably a laminated adjacent window 2' comprising an exterior layer of glass 3' as well as an interior layer of glass 5' and a plastic material interlayer 4' situated between said two layers of glass 3' and 5', said adjacent window 2' having an exterior face 20' oriented toward the exterior E, an interior face 22' oriented toward the interior I and an edge surface 21' situated between these two faces.

The adjacent window 2' preferably has a thickness identical to that of the window 2.

The exterior face 20' of the adjacent window 2' is preferably situated substantially in continuity with or in line with the exterior face 20 of the adjacent window 2.

The interior face 22' of the adjacent window 2' is also preferably situated substantially in line with the interior face 22 of the adjacent window 2 but if this is not the case the rabbet 9 or an additional shim can compensate any difference.

In FIGS. 3 to 7, the rabbet 9 constitutes a crossmember of the body, extending from a left hand side to a right hand side of the body of the vehicle. It constitutes a rigid support for the edges of the window 2 and of the adjacent window 2'. It has a width of the order of 5.0 to 12.0 cm.

The base 72 is situated facing and at a distance from at least one part of the edge surface 21' of the adjacent window 2', that is to say the base 72 is not in contact with the edge surface 21' of the adjacent window 2'.

In FIGS. 3 to 6 the exterior covering 73 is situated facing and in contact with at least one part of said edge surface 21' of the adjacent window 2'. The contact of the exterior covering 73 with the edge surface 21' is merely contact, with no adhesion, in order to enable unclipping of the cover piece if necessary.

Where the adjacent window 2' is concerned, it is possible for its edge surface 21' to be bare, with no plastic material bead, and also and preferably for its exterior face 20' also to be bare, with no plastic material bead.

The adjacent window 2' is stuck to the rabbet 9 that lies under an edge thanks to a bead of glue 10'; this is the same rabbet to which the window 2 is stuck, thanks to a respective bead of glue 10.

It is possible to provide an abutment 11' (or a plurality of abutments distributed along the edge) between the interior face 22' and the face of the rabbet oriented toward the exterior. This abutment or these abutments can make it possible to prevent contact between the interior face 22' and the rabbet in order to make it possible to protect the window 2' and for example to have a flexible exterior face 12'; it or they can moreover make it possible to control the thickness of the bead of glue 10'.

The profiled bead 6 is preferably separated from the edge surface 21' of the adjacent window 2', without direct contact with that edge surface 21'; it is even also preferably completely separated from the adjacent window 2', with no direct contact with the adjacent window 2'.

Figure 6:
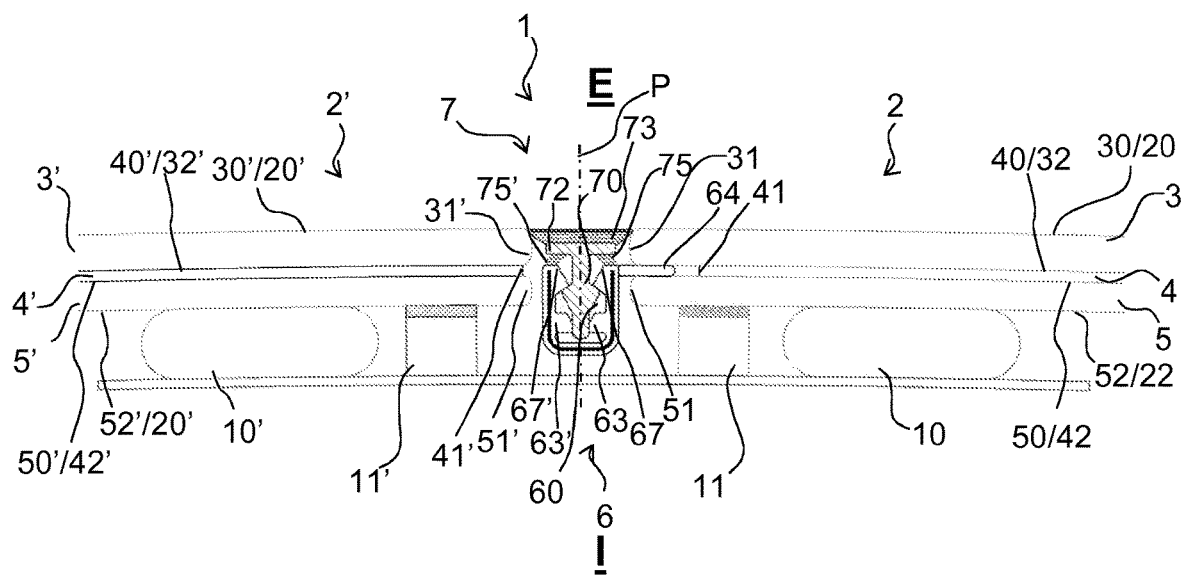
FIG. 6 is a sectional view of a variant of the embodiment from FIG. 5 in which the profiled bead includes an interlayer wing.

In the variants shown in FIGS. 5 to 7 the base 72 includes, seen in cross section, at least one, and preferably two, interior lip(s) 75', 75:
  the interior lip 75 is oriented toward the centripetal throat 67 of the groove 60,
  or even the interior lip 75' is moreover oriented toward the centrifugal throat 67' of the groove 60.

The (or each) interior lip 75, 75' is preferably made of a material different from that of said base 72; this may be a material identical to the constituent material of the exterior covering 73 and in particular a material having a Shore A hardness between 45 and 95 inclusive, or even between 55 and 85 inclusive.

In the variants shown in FIGS. 1 to 6 the exterior covering 73 is in contact, without adhesion, with at least one part of the edge surface 21 of the window 2; moreover, in the variants from FIGS. 3 to 6, the exterior covering 73 is in contact, without adhesion, with at least one part of the edge surface 21' of the adjacent window 2'. The exterior covering 73 may participate in the positioning and the referencing of the cover piece 7.

However, in the variant from FIG. 7, the exterior covering 73 is not in contact at all with at least one part of the edge surface 21 of the window 2; moreover, the exterior covering 73 is not in contact at all with at least one part of the edge surface 21' of the adjacent window 2'; said base 72 includes, seen in cross section, at least one, and preferably two, exterior lip(s) 76, 76':
  the exterior lip 76 is oriented toward the edge surface 21 of the window 2 with contact, without adhesion, with that window 2,
  or even the exterior lip 76' is moreover oriented toward the edge surface 21' of the adjacent window 2' with contact, without adhesion, with that adjacent window 2' or is oriented toward a facing part of the rabbet (not shown) with contact, without adhesion, with that rabbet part.

The (or each) exterior lip 76, 76' is preferably made of a material different from that of the harpoon 70; this may be a material identical to the constituent material of the exterior covering 73; this is a material having a Shore A hardness between 45 and 90 inclusive, or even between 55 and 85 inclusive.

The (or each) exterior lip 76, 76' may participate in the positioning and the referencing of the cover piece 7.

In the variants shown, the harpoon is a double harpoon: it is constituted, seen in cross section, of two bosses oriented away from one another:
  these two bosses being offset from the point of view of the interior/exterior orientation for the variants from FIGS. 1 to 4: the centrifugal boss, intended to come below the centrifugal throat 67' being situated slightly farther toward the exterior than the centripetal boss intended to come below the centripetal throat 67;
  these two bosses being face to face from the point of view of the centrifugal/centripetal orientation for the variants from FIGS. 5 to 7, in order to enable the production of a harpoon having a plane of symmetry P.

Clipping therefore consists in the penetration of the harpoon 70 into the interior of the groove 60 and to be more precise of the two bosses of the harpoon into the interior of the groove 60 and under the two throats.

For correct retention, the width of the mouth, which is smallest between the two throats, is less than the width of the two bosses of the harpoon, at their widest.

FIGS. 5 to 7 show a variant independent of the preceding ones in which:
  on the one hand the groove 60 includes, seen in cross section, two longitudinal bosses 63', 63 situated facing one another and respectively under the centrifugal throat 67' of the groove 60 and under the centripetal throat 67 of said groove 60 in order to produce a guide for the interior end of the harpoon 70 that finds itself between these two bosses 63, 63' when the harpoon is clipped, and
  on the other hand the part of the harpoon 70 inside the groove 60 just below and in contact with the centrifugal throat 67' and the centripetal throat 67 includes, seen in cross section, a centrifugal tooth and a centripetal tooth.

This makes it possible to reduce the clipping force upon introduction of the harpoon 70 into the groove 60 whilst increasing the force necessary for unclipping; this can moreover make it possible to render reliable the positioning of the cover piece relative to the profiled bead and therefore relative to the window that carries this profiled bead.

The harpoon 70 farther includes, seen in cross section, a flat interior end 79 that comes to be lodged between said longitudinal bosses 63, 63' of said groove to improve further the reliability of positioning.

Said cover piece 7 preferably includes, seen in cross section, a plane of symmetry P in order for the cover piece not to have a particular way round for fixing it and to prevent fixing errors.

Said groove 60 also preferably has a plane of symmetry that coincides with that of the cover piece in order to facilitate fitting.

In all the variants, the cover piece 7 may be clipped freely into the groove 60. It may also be unclipped freely from this groove 60 subject to overcoming the retaining forces exerted by the groove on the harpoon and friction:
  between the exterior covering 73 and the edge surface 21, or even the edge surface 21' if the adjacent window 2' is present; or
  between the exterior lip(s) 76.

The cover piece 7 is not stuck to and does not adhere to the profiled bead 6 or to the window 2 or to the adjacent window 2' if the latter is present.

The figures show that the harpoon 70 and the base 72 are in one piece; this embodiment offers ease of manufacture because it is then relatively simple to cause the flexible exterior covering 73 to adhere to the base.

However, it is possible for the harpoon 70 and the base 72 not to be made of the same material; it is possible in particular for the base and the exterior covering to be made from the same flexible material.

Although this is shown, it is possible for the window 2, 2' to include a masking strip situated farther toward the exterior than the interlayer wing and/or farther toward the exterior than the interior wing so as to mask both the interlayer wing and/or the interior wing as well as the bead of glue 10, enabling fixing of the window 2 to the body.

The adjacent window 2' may also include a masking strip (not shown) for masking the bead of glue 10' for fixing the adjacent window 2' to the body.

The present solution is particularly indicated when the glazing 1 has a width between said edge surface 21 and an adjacent rabbet 9 or between said edge surfaces 21, 21' that is relatively small, that is to say between 2.0 and 20.0 mm inclusive, or even between 3.0 and 15.0 mm inclusive, or even between 4.0 and 10.0 mm inclusive.

The present invention may be applied to any glazing and in particular to any vehicle glazing. It may be applied to any edge of this glazing: lefthand, righthand, top or bottom and in particular to a plurality of these edges at the same time, or even to all of these edges at the same time. It may be applied in particular to clipping in the bottom part of a vehicle windshield a plastic material cover piece sometimes called the "water box" or the "cowl vent grille".

The profiled bead 6 may be situated along two lateral edges of the window 2 and/or along three lateral edges of the window 2 and/or along all the edges of the window 2. It need not be situated along a bottom edge, in particular when the glazing is a vehicle windshield; in particular when the glazing includes another type of profiled bead along the bottom edge.

The invention claimed is:

1. A glazing, comprising:
    a laminated window comprising an exterior layer of glass, an interior layer of glass and a plastic material interlayer situated between said exterior and interior layers of glass, said window having an exterior face, an edge surface and an interior face, and said window including, along at least one part of at least one longitudinal edge of said window, a profiled bead, and
    an adjacent laminated window comprising an exterior layer of glass, an interior layer of glass and a plastic material interlayer situated between said exterior and interior layers of glass of said adjacent window, said adjacent window having an exterior face, an edge surface and an interior face,
    wherein said profiled bead includes a groove clipping a cover piece to said profiled bead, said cover piece including, seen in cross section, a harpoon penetrating into said groove during clipping,
    when said harpoon is situated in said groove, said cover piece further including, outside of said groove, a base situated facing and at a distance from both at least one part of said edge surface of said window and at least one part of said edge surface of said adjacent window, and, a flexible exterior covering having a Shore A hardness between 45 and 90 inclusive, and situated facing both at least one part of said edge surface of said window and at least one part of said edge surface of said adjacent window, said base being arranged between the harpoon and the flexible exterior covering.

2. The glazing as claimed in claim 1, wherein said exterior covering has an exterior face that is situated in continuity with said exterior face of said window.

3. The glazing as claimed in claim 1, wherein said base has a width between 2.0 and 20.0 mm inclusive.

4. The glazing as claimed in claim 1, wherein said exterior covering has a width between 1.05 and 1.5 times inclusive a width of said base.

5. The glazing as claimed in claim 1, wherein said profiled bead extends along at least two edges of said window in order to enable production of a flush double connection between said window and an adjacent body rabbet.

6. The glazing as claimed in claim 1, wherein the edge surface of said adjacent window is bare, with no plastic material bead, and the exterior face of said adjacent window is also bare, with no plastic material bead in contact with the exterior face of said adjacent window.

7. The glazing as claimed in claim 1, wherein said profiled bead is separated, without contact, from the edge surface of said adjacent window.

8. The glazing as claimed in claim 1, wherein said profiled bead is situated along a front and/or rear edge of said window positioned flat.

9. The glazing as claimed in claim 1, wherein said profiled bead is peripheral, situated all along a perimeter of said window.

10. The glazing as claimed in claim 1, wherein said profiled bead includes, seen in cross section, an interlayer wing situated between an interlayer face of said exterior layer of glass and an interlayer face of said interior layer of glass of said window.

11. The glazing as claimed in claim 10, wherein said interlayer wing has a thickness:
    equal to a thickness between said exterior layer of glass and said interior layer of glass of said window, or
    less than a thickness between said exterior layer of glass and said interior layer of glass of said window.

12. The glazing as claimed in claim 1, wherein said profiled bead includes, seen in cross section, an interior wing situated below said interior face of said window.

13. The glazing as claimed in claim 1, wherein said base includes, seen in cross section, at least one interior lip respectively oriented toward a centrifugal throat of said groove and/or toward a centripetal throat of said groove.

14. The glazing as claimed in claim 1, wherein said exterior covering is in contact with at least one part of said edge surface of the window, or even in contact with at least one part of said edge surface of the adjacent window.

15. The glazing as claimed in claim 1, wherein said base includes, seen in cross section, at least one exterior lip respectively oriented toward said edge surface of the window with contact and/or toward said edge surface of said adjacent window with contact.

16. The glazing as claimed in claim 1, wherein said groove includes, seen in cross section, two longitudinal bosses situated facing one another and respectively below a centrifugal throat of said groove and a centripetal throat of said groove (60).

17. The glazing as claimed in claim 1, wherein said base is at a distance above said groove.

18. The glazing as claimed in claim 1, wherein said cover piece has, seen in cross section, a plane of symmetry.

19. The glazing as claimed in claim 1, wherein said cover piece has, seen in cross section, an exterior covering that extends laterally farther toward a rabbet or the adjacent window than toward said window when said harpoon is taken as the reference.

20. The glazing as claimed in claim 1, wherein the glazing is a vehicle glazing.

* * * * *